(12) United States Patent
Panos et al.

(10) Patent No.: US 6,478,553 B1
(45) Date of Patent: Nov. 12, 2002

(54) HIGH THRUST TURBOCHARGER ROTOR WITH BALL BEARINGS

(75) Inventors: Jean B Panos, York, PA (US); James William Heilenbach, Riverside, IL (US); Eric J Duve, Riverside, IL (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/844,741

(22) Filed: Apr. 24, 2001

(51) Int. Cl.[7] ............................................. F04B 17/00
(52) U.S. Cl. ..................... 417/407; 384/527; 384/99; 384/463; 384/448; 384/456; 384/492; 308/213; 310/90
(58) Field of Search ..................... 417/407; 308/213; 384/527, 99, 463, 448, 456; 415/229; 416/241 B; 310/90

(56) References Cited

U.S. PATENT DOCUMENTS

| 2,841,244 | A | * | 7/1958 | Sorem | 384/448 |
|---|---|---|---|---|---|
| 3,829,183 | A | * | 8/1974 | Hingley | 308/213 |
| 4,116,502 | A | * | 9/1978 | Horler | 417/407 |
| 4,541,786 | A | * | 9/1985 | McLean | 417/407 |
| 5,163,757 | A | * | 11/1992 | Graham | 384/463 |
| RE34,276 | E | * | 6/1993 | Glaser et al. | 417/407 |
| 5,425,584 | A | * | 6/1995 | Ide | 384/99 |
| 6,220,829 | B1 | * | 4/2001 | Thompsin et al. | 417/407 |
| 6,318,899 | B1 | * | 11/2001 | Boyd | 384/492 |
| 2001/0030476 | A1 | * | 10/2001 | Brown | 310/90 |

FOREIGN PATENT DOCUMENTS

| JP | 363111315 | A | * | 5/1988 | |
| JP | 404004314 | A | * | 1/1992 | 384/456 |

* cited by examiner

Primary Examiner—Thomas Denion
Assistant Examiner—Thai-Ba Trieu
(74) Attorney, Agent, or Firm—Cary W. Brooks

(57) ABSTRACT

An improved turbocharger for railway locomotive sized engines includes, in a preferred embodiment, first and second axially spaced ball bearings supporting a rotor with the first bearing being a hybrid ceramic ball bearing mounted to accept both radial and axial loads acting on the shaft at the compressor end. The first bearing is mounted on a reduced diameter portion of the shaft, providing reduced bearing diameter to acceptably limit centrifugal loading of ceramic balls in the bearing against a surrounding bearing race. The first bearing has dual rows of ceramic ball bearings mounted to share all axial thrust loads on the shaft. The second bearing is also a ball bearing. Lubrication of the bearings is preferably by direct impingement on the inner race to minimize oil churning causing heating and power loss. Additional features and advantages are disclosed.

13 Claims, 3 Drawing Sheets

HIGH THRUST TURBOCHARGER ROTOR WITH BALL BEARINGS

TECHNICAL FIELD

This invention relates to engine turbochargers and particularly to a novel ball bearing mounting of a high thrust turbocharger rotor.

BACKGROUND OF THE INVENTION

A turbocharger for a medium speed diesel engine, adaptable for use in railway road locomotives and other applications, has a rotor with a radial flow compressor wheel or impeller and an axial flow turbine wheel or turbine, unlike typical automotive turbochargers. The wheels are carried at opposite ends of a connecting shaft supported at two spaced bearing locations with the wheels overhung. This configuration is known as a flexible rotor, since it will operate above its first, and possibly second, critical speeds. It can therefore be subject to rotor dynamic conditions such as whirl and synchronous vibration.

High thrust loads are created by the difference in air pressures across the turbine and compressor wheels. These loads can be quite large due to the relatively large radial area of the wheels. The net thrust loads on the wheels are in the same direction, creating a high overall thrust on the rotor. The radial load due to the static weight of the rotor is comparatively small.

Turbocharger design can include the use of sealing devices at the rim of turbine wheel to help control pressure on the face of the turbine wheel inboard of the blades. This is feasible because the high temperature turbine end materials have more closely matched thermal expansion coefficients than the aluminum wheel and ferrous housing materials typical of the compressor end of the turbocharger. Thus, at the turbine end, a reasonable range of clearances can be obtained.

On the upstream end, the aim is to keep the flowpath pressure off the face of the turbine wheel. This pressure pushes in the same direction as the thrust on the compressor wheel. On the downstream end, if the face could be pressurized it would help to reduce the compressor wheel thrust effect by pushing the other way. In practice, this is difficult, because the seal must be made very tight or else an extremely high flow of pressurized air is required, only to be directly exhausted out of the turbocharger without being used to do any work.

Diesel locomotive engines, and turbochargers, may operate over an extremely large range of conditions, from minus 40 degrees at startup to the high temperatures and high turbine speeds experienced in a high altitude tunnel. With aluminum compressor wheels chosen for low inertia and quick response, their rotating and static thermal coefficients are poorly matched to the housing so that sealing the back face of the compressor wheel is not a currently practical option. Since the compressor pressure ratio is considerably higher than that of the turbine, a higher pressure acts over an area about equal to that of the turbine.

Even with the use of seals where practical, and more so without them, the high thrust loads acting on the rotor, as well as the potential for whirl and vibration, have made hydrodynamic fluid film bearings the universal choice for turbochargers of this type as compared to the common use of ball bearings in automobile engine turbochargers. Hydrodynamic fluid film bearings feature high load capacity, variable stiffness, essentially infinite life if the fluid film is maintained, and allow large shaft diameter for better stiffness and lower vibration. However, they require high oil flow and cause high power losses, which reduce overall efficiency.

Ball bearings require much lower oil flow and operate with lower power loss for improved efficiency as well as more consistent stiffness over the operating range. However, they have lower thrust load capacity, have finite operating life due to metal fatigue of the moving parts, and must be limited in diameter so that high rotating speeds do not put excessive centrifugal loads on the balls. As a result, ball bearings are not known to have been successfully applied to turbochargers of the type described as used in railroad engines and other applications.

SUMMARY OF THE INVENTION

The present invention provides a turbocharger, adapted for use in railroad locomotive engines and other applications, combined with a ball bearing rotor mounting capable of accepting both radial support loads and axial thrust loads applied to the rotor of a railroad engine turbocharger.

In a preferred embodiment, the turbocharger includes a housing carrying a rotor having an axial flow turbine wheel and a radial flow compressor wheel. The wheels are supported at opposite ends of a shaft carried in the housing on oil lubricated first and second bearings spaced axially adjacent to compressor and turbine ends respectively of the shaft. The arrangement provides an overhung rotor mounting with axial thrust loading normally applied to the shaft from both wheels in the same direction from the turbine toward the compressor.

In the improved assembly, the first bearing includes at least one hybrid ceramic ball bearing mounted to accept both radial and axial loads acting on the shaft at the compressor end. The first bearing is mounted on a reduced diameter portion of the shaft, providing reduced bearing diameter to acceptably limit centrifugal loading of ceramic balls in the bearing against a surrounding bearing race.

Additional features may include a first bearing having dual rows of ceramic ball bearings mounted to share all axial thrust loads on the shaft. The second bearing may also be a ball bearing and, optionally, a hybrid ceramic thrust bearing on a reduced diameter shaft portion to limit centrifugal loading of the balls in the bearing. Lubrication of the bearings is preferably by direct impingement on the inner race to minimize oil churning causing heating and power loss. The shaft between the bearings preferably has a greater diameter than at the bearing locations to maintain adequate bending stiffness in the overhung rotor. The second bearing may be made slidable in the housing to direct all thrust loads to the dual row first bearing. A squeeze film damper may carry the second bearing to minimize whirl at the turbine end of the rotor. The shaft may be separate from the compressor and turbine wheels and include a yieldable fastener, such as a stud or bolt extending through the compressor wheel and the shaft to engage the turbine wheel and maintain a relatively constant clamping load on the rotor.

These and other features and advantages of the invention will be more fully understood from the following description of certain specific embodiments of the invention taken together with the accompanying drawings.

DESCRIPTION OF THE PREFERRED EMBODIMENT

Figure 1:
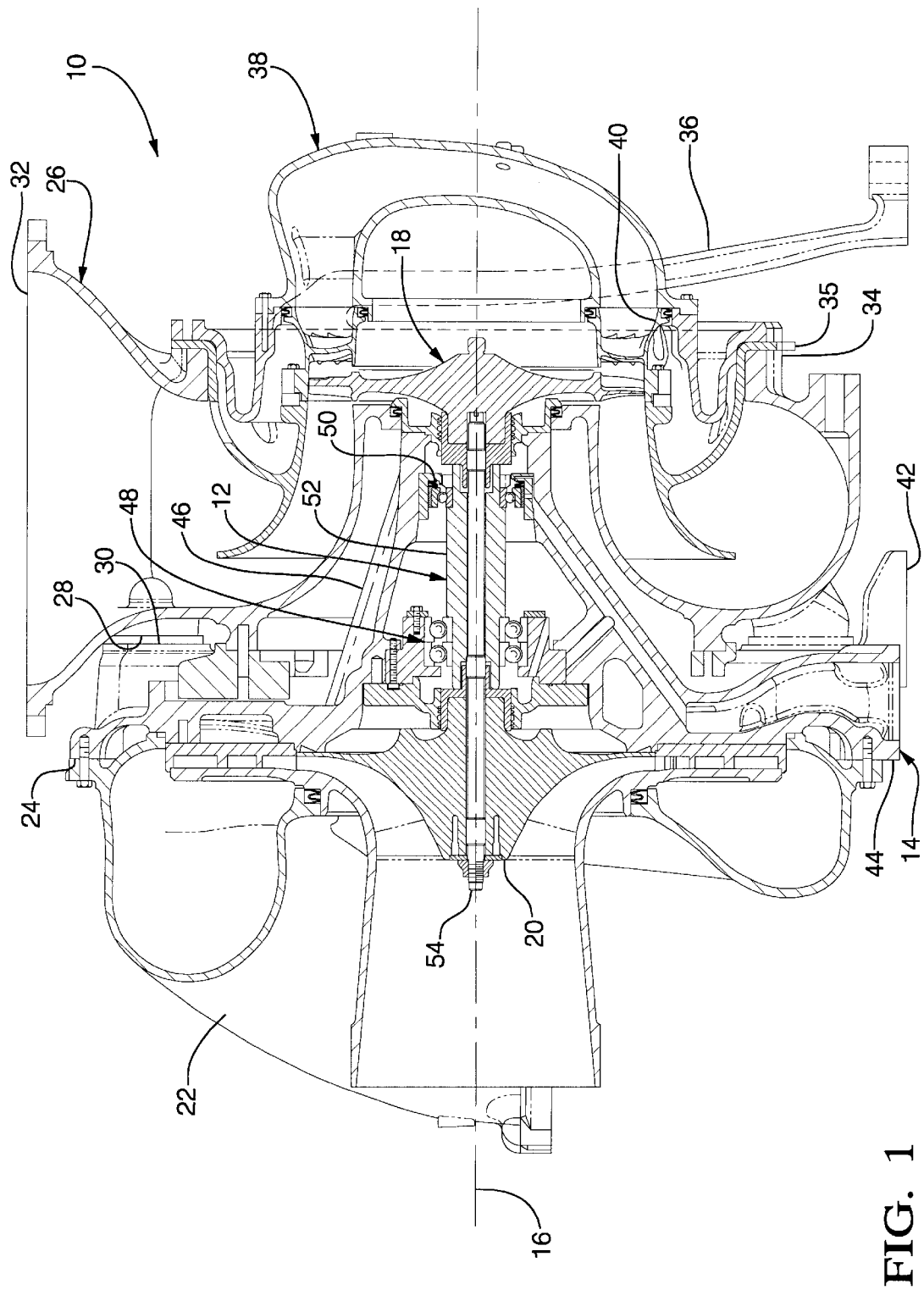
FIG. 1 is a cross-sectional view of an engine turbocharger having a ball bearing mounted rotor according to the invention.

Referring now to the drawings in detail, numeral 10 generally indicates an exhaust driven turbocharger for an engine, such as a diesel engine intended for use in railway locomotives or other applications of medium speed diesel engines. Turbocharger 10 includes a rotor 12 carried by a rotor support 14 for rotation on a longitudinal axis 16 and including a turbine wheel 18 and a compressor wheel 20. The compressor wheel is enclosed by a compressor housing assembly 22 including components which are supported on an axially facing first side 24 of the rotor support 14. An exhaust duct 26 has a compressor end 28 that is mounted on a second side 30 of the rotor support 14 spaced axially from the first side 24.

The exhaust duct 26 is physically positioned between the rotor support 14 and the turbine wheel 18 to receive exhaust gases passing through the turbine wheel and carry them to an exhaust outlet 32. A turbine end 34 of the exhaust duct 26 and an associated nozzle retainer assembly 35 are separately supported by an exhaust duct support 36 that is connected with the exhaust duct 26 at the turbine end 34. The exhaust duct support 36 also supports a turbine inlet scroll 38 which receives exhaust gas from an associated engine and directs it through a nozzle ring 40 to the turbine wheel 18 for transferring energy to drive the turbocharger compressor wheel 20.

The rotor support 14 includes a pair of laterally spaced mounting feet 42 which are rigidly connected to an upstanding mounting portion 44 of the rotor support 14 and are adapted to be mounted on a rigid base, not shown. The rotor support 14 further includes a tapering rotor support portion 46 having ball bearings 48, 50 that rotatably support the rotor 12 and are subsequently further described.

Figure 2:
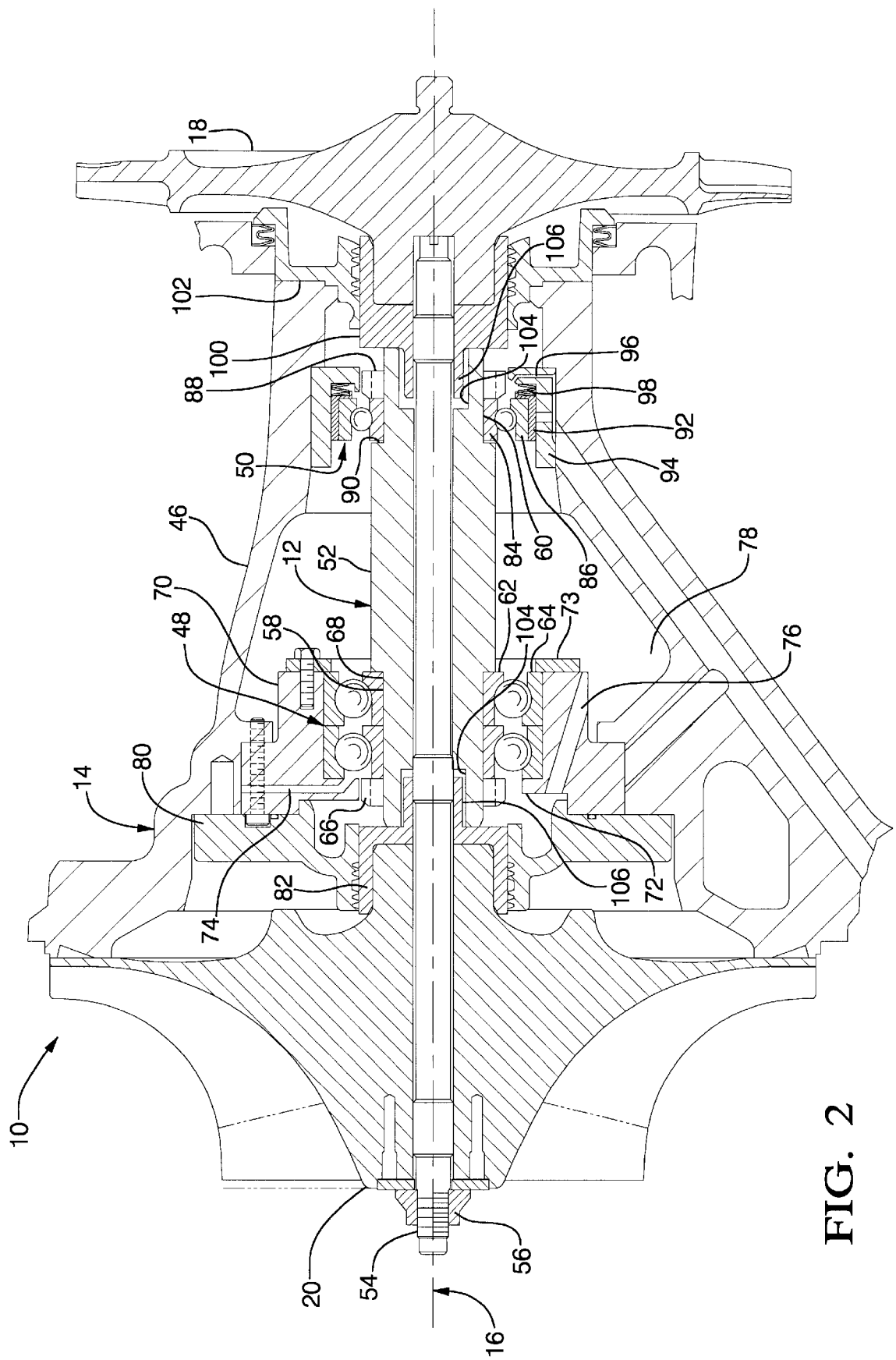
FIG. 2 is an enlarged cross-sectional view of the rotor and bearing mounting portions of the turbocharger of FIG. 1.

Referring particularly to FIG. 2, the rotor 12 includes a shaft 52 extending between and operatively engaging inner ends of the turbine wheel 18 and the compressor wheel 20. A resilient fastener in the form of a stud 54 extends through axial openings in the compressor wheel 20 and shaft 52 and engages a threaded opening in the turbine wheel 18. A nut 56 on the stud 54 engages a washer on the outer end of the compressor wheel to clamp the rotor components together with a desired preload. The stud is resiliently stretched so that the preload remains relatively constant in spite of variations in the axial length of the rotor assembly under operating and stationary conditions.

In accordance with the invention, the rotor 12 is supported by first and second axially spaced ball bearings 48, 50, respectively. The bearings engage reduced diameter mounting portions 58, 60 at opposite ends of the shaft 52. The mounting portion diameters are sized to reduce the bearing race diameters to maintain centrifugal forces on the bearing balls within acceptable limits. The portions of shaft 52 between the mounting portions are maintained large to provide a stiff connection between the compressor and turbine wheels.

At the compressor end of the shaft, bearing 48 includes dual rows of hybrid ceramic ball bearings having inner and outer races 62, 64 in axial engagement for transferring thrust loads. The inner races 62 are clamped by a nut 66 against a shoulder 68 at the inner end of the mounting portion 58. The outer races 64 are received in a bore of a bearing housing 70 that is secured in and radially located by the rotor support portion 46 of the rotor support 14. The dual row bearing 48 transfers primary thrust loads to a radial flange 72 of the bearing housing 70. A retainer plate 73 mounted on the bearing housing 70 traps the outer races 64 in the bearing housing and limits axial motion during axial thrust reversals.

An oil feed passage 74 in the bearing housing sprays oil directly from the flange 72 into the bearing 48 between the inner and outer races. Excess oil from the bearing drains in part through a drain passage 76 into an open drain area 78. An oil seal member 80 is radially located by the bearing housing 70 but is axially located by mounting to the rotor support portion 46. Member 80 cooperates with a seal adapter 82 fixed on a stub of the compressor wheel 20 to limit oil leakage from the bearing 48 toward the compressor wheel.

At the turbine end of the shaft 52, bearing 50 is a single row bearing having inner and outer races 84, 86. The bearing 50 may be a conventional or hybrid ceramic type and can be made smaller as it carries primarily relatively light radial loads. The inner race 84 is secured by a nut 88 against a shoulder 90 at the inner end of the reduced diameter mounting portion 60. The outer race 86 is carried in a squeeze film damper (SFD) sleeve 92 that floats in a SFD housing 94 fixed in the rotor support portion 46. Oil is supplied to the SFD through a groove in the SFD housing which also supplies an oil feed passage 96 that delivers oil directly to the bearing balls between the races 84, 86. A preload spring stack 98, between a flange of the SFD housing 94 and the SFD sleeve 92, biases the sleeve and the bearing outer race 86 axially toward the shoulder 90 to maintain continuous axial load on the balls during limited axial bearing motion and avoid ball skidding and subsequent fatigue.

An adapter 100 on a stub of the turbine wheel cooperates with a seal member 102 mounted on the rotor support portion 46 to limit oil leakage toward the turbine wheel. The bearing 50 is drained directly into the central oil drain area 78 of the rotor support portion 46.

Ball bearings used in high speed rotating machines tend to be life limited by centrifugal forces acting on the bearing balls. The size of the bearing balls and the diameter of the ball races are thus important factors in the application of ball bearings to turbomachinery. Accordingly, ball bearings are commonly used with small automotive engine turbocharger rotors because the small diameters of balls and races permit long life with conventional bearing materials. For the same reasons, ball bearing applications are not found in large engine turbochargers with large diameter shafts and heavy thrust loads requiring larger bearings.

The present invention overcomes these problems by combining several features that make the application of ball bearings practical in engines of a size useful in diesel road freight locomotives and other comparable applications. For example, at least the larger, thrust carrying bearing 48 is mounted on a reduced diameter portion 58 at the end of the shaft. This allows the bearing race diameter to be reduced while the portion of the shaft between the bearings remains large as is needed for adequate stiffness. A double row bearing is used if needed to carry the high thrust loads involved. Also, hybrid ceramic ball bearings are used in, at least, the high load position. The ceramic balls are lighter than alloy steel but have high capacity so that the centrifugal force of the balls is reduced and the fatigue life of the bearings is extended.

Figure 3:
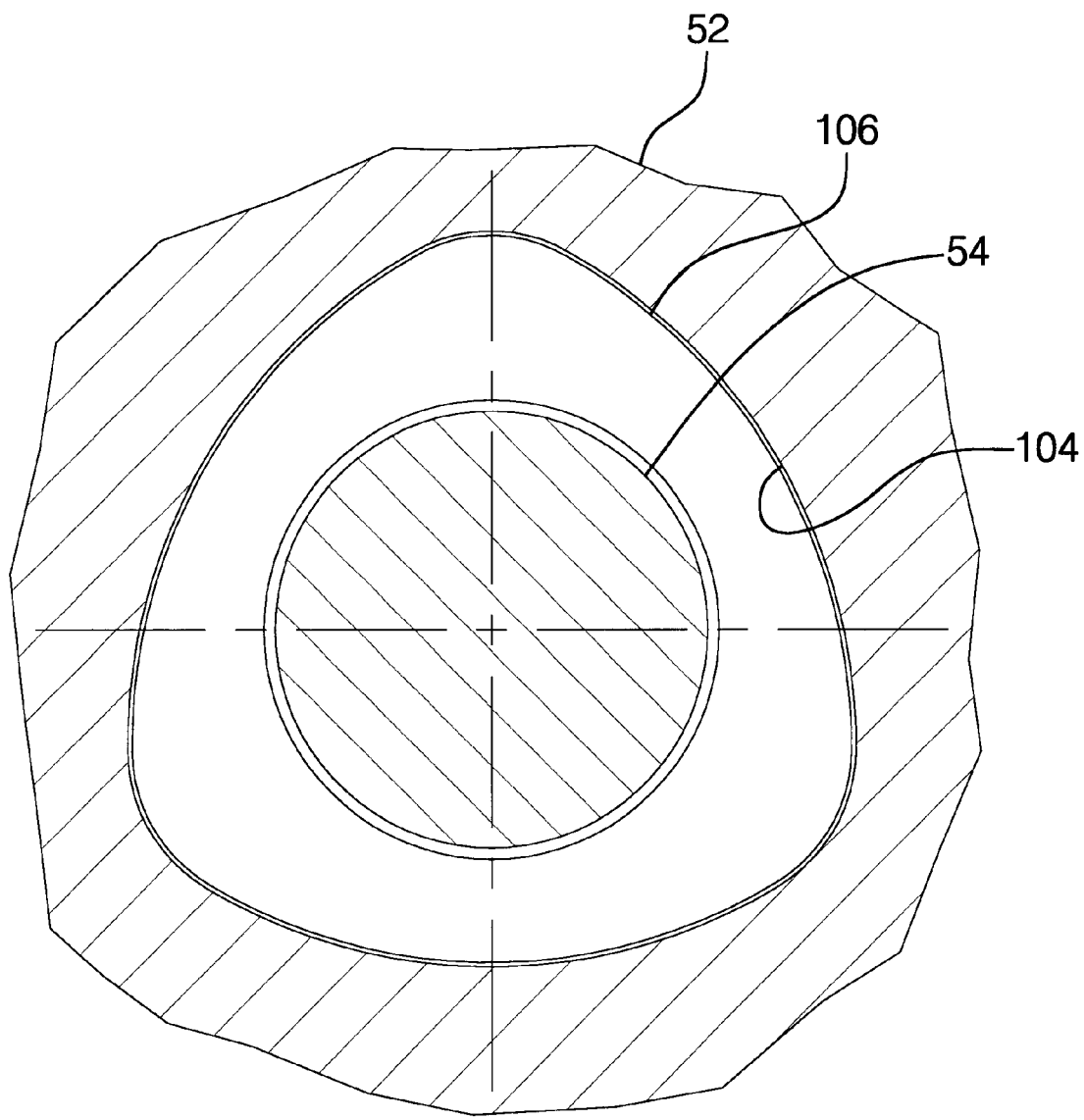
FIG. 3 is a cross-sectional view through the rotor shaft toward the end of compressor adapter showing a polygon drive connection.

Because the diameters of the shaft ends are reduced, a more compact and efficient drive coupling is provided between the shaft 52 and the turbine and compressor wheels 18, 20. P3 polygon shaped openings 104 are presently preferred to couple the shaft 52 to mating polygon projections 106 extending from adapters 82, 100, which are pressed onto the wheels 18, 20 and provide running lands or surfaces for the labyrinth seals. FIG. 3 is a cross-sectional view through the shaft 52 toward the end of the adapter 82 showing the shape of the preferred P3 polygon projection 106 which mates with a similarly shaped polygon opening 104 in the adapter 82. If desired the projections could extend from the shaft and mate with openings formed in the adapters.

In operation of the turbocharger 10, pressurized exhaust gas is delivered through the turbine inlet scroll 38 to the turbine wheel 18 where it imparts energy to the turbine blades to drive the rotor 12 and is then exhausted at a lower pressure. Higher gas pressure on the inlet face of the turbine wheel yields an axial thrust force in the direction of the compressor wheel. The rotating compressor wheel 20 draws in ambient air moving axially and exhausts it radially at a higher pressure to the compressor housing 22. The outlet pressure acts against the inner side of the compressor wheel 20 and yields an additional axial thrust force on the rotor, adding to the thrust of the turbine wheel 18. These thrust forces are absorbed fully by the dual row ceramic ball bearing 48 which carries the thrust loads from the turbine shaft 52 to the bearing housing 70 and thus to the rotor support 14.

The thrust loads generate forces much higher than the radial support loads, which are shared between the rotor bearings 48 and 50. Bearing 50 is allowed to move axially with its squeeze film damper (SFD) sleeve 92 in the SFD housing 94. However, it is expected to handle small transient thrust loads opposite to the direction of primary thrust forces. The spring stack 98 biases the bearing outer race toward the shaft shoulder 90 to maintain a small axial load on the bearing balls. Thus, bearing 50 carries primarily radial loads and may be made smaller than bearing 48. The axial loading of bearing 50 helps to avoid ball skidding which could adversely impact bearing fatigue life. The squeeze film damper is applied to counteract so called shaft whirl where the shaft or turbine wheel tends to orbit if the bearing is too lightly loaded. However a squeeze film damper may not be required in all turbocharger applications.

Lubrication of the bearings by direct impingement of oil at the ball/race interface together with limiting the amount of oil delivered and draining excess oil quickly, avoids oil churning, bearing overheating and failure. The power losses from pumping the oil and viscous resistance of prior hydrodynamic bearings are greatly reduced with the ball bearings and oil delivery system of the disclosed embodiment.

Advantages of the present invention over turbochargers using the current bearing technology include, without limitation, reduced oil consumption and horsepower loss without the need for expensive dynamic air seals, improved rotor dynamics with the use of bearings more appropriate for the relatively light radial loads, simplified shaft seals due to the low oil consumption, and a potentially less complex oil supply system for the turbocharger.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A turbocharger for medium speed diesel engines adapted for use in railroad locomotives and other applications, the turbocharger having a housing carrying a rotor including an axial flow turbine wheel and a radial flow compressor wheel supported at opposite ends of a shaft carried in the housing on oil lubricated first and second bearings spaced axially adjacent compressor and turbine ends respectively of the shaft and providing overhung rotor mounting with axial thrust loading normally applied to the shaft from both wheels in the same direction from the turbine toward the compressor, and the improvement wherein:

said first bearing comprises at least one hybrid ceramic ball bearing mounted to accept both radial and axial loads acting on the shaft at the compressor end, said first bearing mounted on a reduced diameter portion of the shaft and providing reduced bearing diameter to acceptably limit centrifugal loading of ceramic balls in the bearing against a surrounding bearing race; and said second bearing is a single row ball bearing that primarily carries only radial loads and is mounted on a second reduced diameter portion of the shaft to acceptably limit centrifugal loading of balls in the second bearing against a sounding bearing race.

2. A turbocharger as in claim 1 wherein said second bearing is hybrid ceramic ball bearing.

3. A turbocharger as in claim 2 wherein said second bearing is slidable in the housing to direct primary thrust loading of the rotor to the first bearing.

4. A turbocharger as in claim 3 wherein said second bearing is mounted with a squeeze film damper to minimize whirl of the turbine end of the rotor.

5. A turbocharger having a housing carrying a rotor including an axial flow turbine wheel and a radial flow compressor wheel supported at opposite ends of a shaft carried in the housing on oil lubricated first and second bearings spaced axially adjacent compressor and turbine ends respectively of the shaft and providing an overhung rotor mounting with axial thrust loading normally applied to the shaft from both wheels in the same direction from the turbine toward the compressor, and the improvement wherein:

said rotor includes an axial fastener extending through the compressor and the shaft to engage the turbine and hold components of the rotor together with an initial axial load, the fastener being axially yieldable to maintain the axial load on the rotor relatively constant under varying temperature operating conditions of the rotor; and said first bearing comprises at least one hybrid ceramic ball bearing mounted to accept both radial and axial loads acting on the shaft at the compressor end, said first bearing mounted on a reduced diameter portion of the shaft and providing reduced bearing diameter to acceptably limit centrifugal loading of ceramic balls in the bearing against a surrounding bearing race.

6. A turbocharger as in claim 5 wherein said first bearing includes dual rows of ceramic ball bearings sharing all the primary thrust loads on the shaft to maintain thrust loading of the bearing within acceptable limits.

7. A turbocharger as in claim 5 wherein said second bearing is a single row ball bearing that primarily carries only radial loads and is mounted on a second reduced diameter portion of the shaft to acceptably limit centrifugal loading of balls in the second bearing against a surrounding bearing race.

8. A turbocharger as in claim 7 wherein said second bearing is a hybrid ceramic ball bearing.

9. A turbocharger as in claim 8 wherein said second bearing is slidable in the housing to direct primary thrust loading of the rotor to the first bearing.

10. A turbocharger as in claim 9 wherein said second bearing is mounted with a squeeze film damper to minimize whirl of the turbine end of the rotor.

11. A turbocharger as in claim 5 wherein said first bearing is lubricated with a controlled amount of oil applied by direct impingement to an interface of the balls with an inner race of the bearing to limit oil churning.

12. A turbocharger as in claim 5 wherein a portion of the shaft between the first and second bearings has a greater outside diameter than said reduced diameter to maintain adequate bending stiffness in the overhung rotor.

13. A turbocharger as in claim 5 wherein polygon projections in mating recesses comprise drive elements between the shaft and the connected turbine and compressor wheels.

* * * * *